Feb. 19, 1946.   G. G. GUINN   2,394,995
TRACTION APPLIANCE FOR WHEELS
Filed July 10, 1943   3 Sheets-Sheet 1

Inventor
Garvin G. Guinn

By Clarence A. O'Brien
and Harvey B. Jacobson
Attorneys

Feb. 19, 1946.   G. G. GUINN   2,394,995
TRACTION APPLIANCE FOR WHEELS
Filed July 10, 1943   3 Sheets-Sheet 2
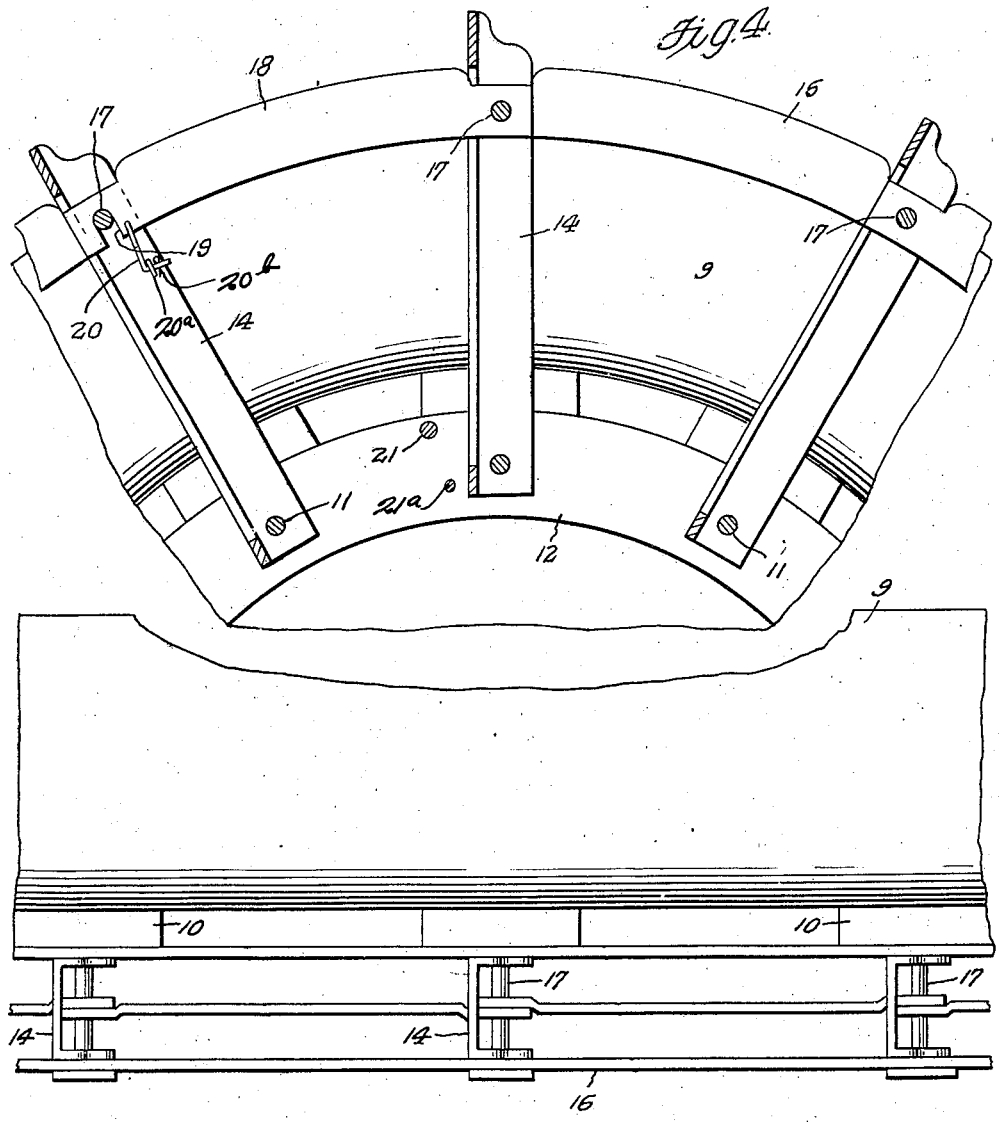

Feb. 19, 1946.   G. G. GUINN   2,394,995
TRACTION APPLIANCE FOR WHEELS
Filed July 10, 1943   3 Sheets-Sheet 3

Inventor
Garvin G. Guinn

By Clarence A. O'Brien
and Harvey B. Jacobson
Attorneys

Patented Feb. 19, 1946

2,394,995

UNITED STATES PATENT OFFICE 2,394,995

TRACTION APPLIANCE FOR WHEELS

Garvin G. Guinn, Los Angeles, Calif.

Application July 10, 1943, Serial No. 494,224

2 Claims. (Cl. 301—46)

This invention relates to new and useful improvements in traction devices and more particularly to an appliance for the wheels of tractors and trucks to increase the traction when traveling over muddy or slippery roads and fields.

The principal object of the present invention is to provide a traction device which may form a permanent part of a wheel and which can be readily collapsed to an inoperative position when its use is not desired.

Another important object of the invention is to provide a traction device which is positive acting and substantially foolproof in operation.

Other objects and advantages of the invention will become apparent to the reader of the following description.

In the drawings—

Figure 2 is a fragmentary top plan view.

Figure 4 is a fragmentary longitudinal sectional view of the appliance in extended position.

Figure 1:
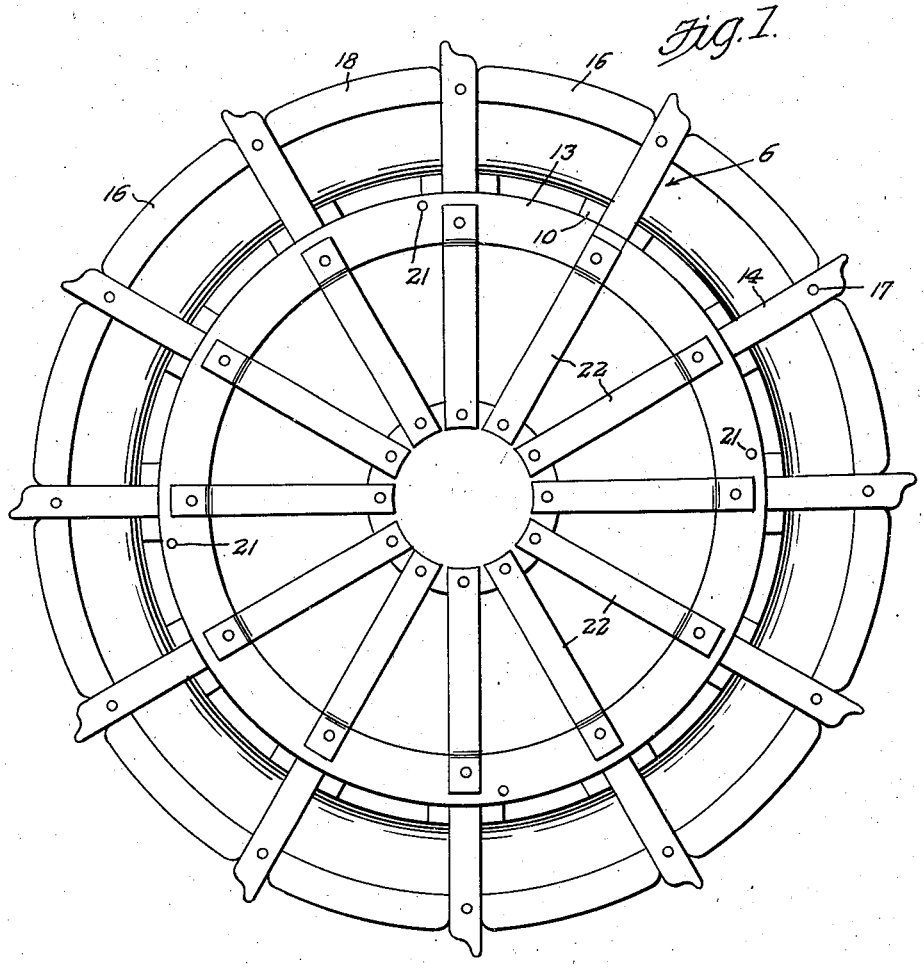
Figure 1 represents a side elevational view of a wheel equipped with the novel traction device.
Figure 6:
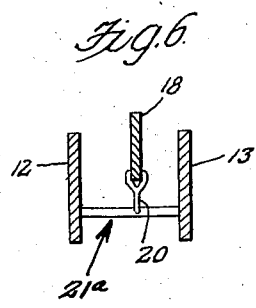
Figure 6 is a sectional view taken substantially on the line 6—6 of Figure 5.

Referring to the drawings wherein like numerals designate like parts, it can be seen that numeral 5 generally refers to a conventional wheel, while numeral 6 generally refers to the improved traction device. The wheel 5 briefly consists of a spoke assembly or disk 7 having a rim 8 on which is a pneumatic tire 9, or in fact any other type of tire.

The device 6 consists in the provision of a plurality of circumferentially spaced blocks 10 on the disk 7 and at the rim 8 and these blocks are bored to accommodate bolts 11.

The bolts 11 extend through openings in a pair of rings 12, 13 and also through the inner end portions of channeled traction fingers 14, each of which is slotted as at 15.

Figure 5:
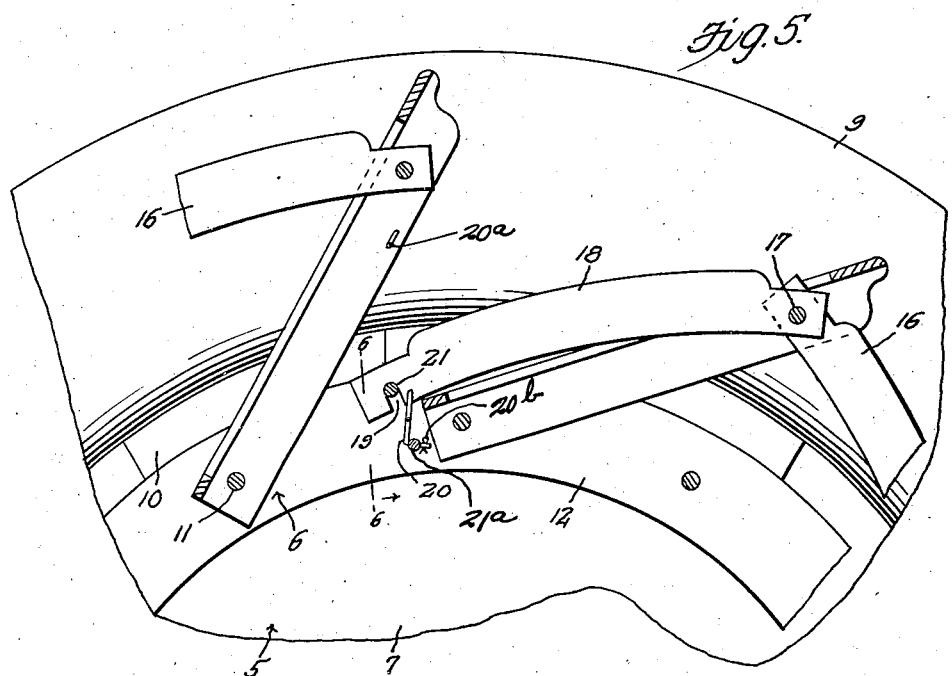
Figure 5 is a fragmentary longitudinal sectional view showing the appliance in collapsed position.

The fingers 14 are arranged in groups, say four groups to a wheel, each group including link bars 16 having reduced ends disposed through the slots 15 and pivotally connected to the fingers 14 by pins 17, and a latch bar 18 which has one end reduced and pivotally connected to one finger 14 by a pin 17 while its opposite end is notched as at 19 to hook over the pin 17 of the adjacent finger 14 in the next group of said finger, this being clearly shown in Figure 4. This notched end of the latch bar 18 has a swingable hook 20 thereon which is capable of engaging a loop pin 21 interposed between the rings 12, 13, as is clearly shown in Figures 4 and 5. A cotter pin 20b may be used for preventing displacement of the hook from the loop.

Figure 3:
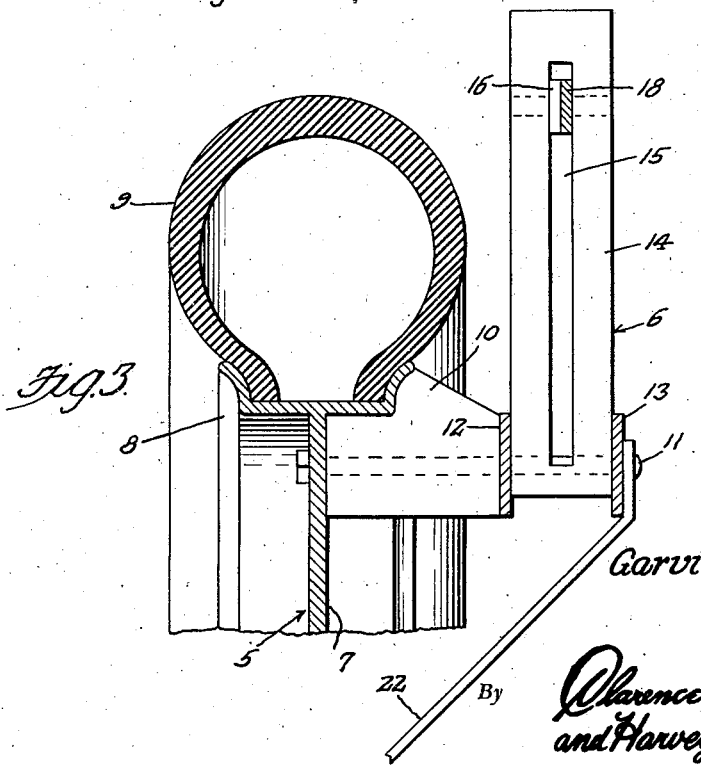
Figure 3 is a fragmentary vertical sectional view through the appliance in extended position.

Suitable brace means 22 can be provided between the outermost ring 13 and the central portion of the wheel 5, this being clearly shown in Figures 1 and 3.

It can now be seen that Figures 1 and 4 show the fingers 14 in extended position for use in increasing traction. However, by disengaging the latch bars 18 from the pin 17, the fingers 14 of the several finger units can be swung to the position shown in Figure 5 and the hooks 20 disposed through a pin 21a when the cotter pin 20b can again be used. This hooking of the hooks 20 with the pins 21 will result in holding the fingers in collapsed position as substantially shown with respect to one group in Figure 5.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a traction device for attachment to a wheel, an annulus adapted to be attached to said wheel, a plurality of traction fingers having inner ends pivoted to said annulus for swinging of the fingers into and from radial positions, links having ends pivoted to the outer ends of said fingers for swinging of the opposite ends thereof into and from crossed relation to the adjacent fingers, coacting notch and pin devices for said opposite ends of the links and the outer ends of the fingers, respectively, for connecting said opposite ends of said links to the outer ends of the fingers in the radial position of said fingers, and coacting latch devices on said opposite ends of the links and the fingers connected thereto for maintaining the notches and pins in coacting relation.

2. In a traction device for attachment to a wheel, an annulus adapted to be attached to said wheel, a plurality of traction fingers having inner ends pivoted to said annulus for swinging of the fingers into and from radial positions, links having ends pivoted to the outer ends of said fingers for swinging of the opposite ends thereof into and from crossed relation to the adjacent fingers, coacting notch and pin devices for said opposite ends of the links and the outer ends of the fingers, respectively, for connecting said opposite ends of said links to the outer ends of the fingers in the radial position of said fingers, and coacting latch devices on said opposite ends of the links and the fingers connected thereto for maintaining the notches and pins in coacting relation, said links being swingable on said fingers to dispose said opposite ends thereof alongside said annulus when the fingers are swung out of radial position, and means on said annulus coacting with the latch devices on said opposite ends of the links to latch said ends to said annulus.

GARVIN G. GUINN.